US012233648B2

(12) United States Patent
Watanabe

(10) Patent No.: US 12,233,648 B2
(45) Date of Patent: Feb. 25, 2025

(54) THIN FILM MANUFACTURING METHOD AND METHOD OF MANUFACTURING SUBSTRATE

(71) Applicant: CANON KABUSHIKI KAISHA, Tokyo (JP)

(72) Inventor: Keiji Watanabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/371,400

(22) Filed: Jul. 9, 2021

(65) Prior Publication Data

US 2022/0032623 A1 Feb. 3, 2022

(30) Foreign Application Priority Data

Jul. 29, 2020 (JP) ................................ 2020-127867

(51) Int. Cl.

| | |
|---|---|
| ***B41J 2/16*** | (2006.01) |
| ***B05D 3/00*** | (2006.01) |
| ***B05D 3/12*** | (2006.01) |

(52) U.S. Cl.

CPC ............ *B41J 2/1606* (2013.01); *B05D 3/007* (2013.01); *B05D 3/12* (2013.01); *B41J 2/1621* (2013.01)

(58) Field of Classification Search

CPC ........... B41J 2/1606; B05D 3/007; B05D 3/12

See application file for complete search history.

(56) References Cited

U.S. PATENT DOCUMENTS

| | | | | |
|---|---|---|---|---|
| 9,873,255 | B2 | 1/2018 | Sasaki et al. | |
| 10,137,665 | B2 | 11/2018 | Noguchi et al. | |
| 2009/0186293 | A1* | 7/2009 | Fannin | G03F 7/0035 430/320 |
| 2019/0077156 | A1* | 3/2019 | Yamamuro | B41J 2/1626 |

FOREIGN PATENT DOCUMENTS

| | | | | | |
|---|---|---|---|---|---|
| JP | 2016-35832 | A | | 3/2016 | |
| JP | 2016-64598 | A | | 4/2016 | |
| JP | 2016064598 | A | * | 4/2016 | |
| JP | 2016-76365 | A | | 5/2016 | |
| JP | 2016-203548 | A | | 12/2016 | |
| JP | 2017-128106 | A | | 7/2017 | |
| JP | 2019-51623 | A | | 4/2019 | |
| WO | WO-2014021831 | A1 | * | 2/2014 | B29C 43/24 |

OTHER PUBLICATIONS

Lee, Microdrop Generation, CRC Press, 2003, p. 146-147 (Year: 2003).*

Notice of Reasons for Refusal in Japanese Application No. 2020-127867 (Mar. 2024).

* cited by examiner

*Primary Examiner* — Tabatha L Penny

(74) *Attorney, Agent, or Firm* — Venable LLP

(57) ABSTRACT

A thin film manufacturing method of manufacturing a laminate of a thin film of a coating film member and a support member includes a coating step of coating the coating film member on a surface of the support member, a sandwiching step of sandwiching the coating film member between the support member and a peeled-off member, a film thinning step of reducing a thickness of the coating film member by applying an external force to the coating film member sandwiched between the support member and the peeled-off member in a state where the coating film member is softened, and a peeling step of peeling the peeled-off member off the coating film member after the film thinning step.

10 Claims, 5 Drawing Sheets

THIN FILM MANUFACTURING METHOD AND METHOD OF MANUFACTURING SUBSTRATE

BACKGROUND OF THE INVENTION

Field of the Invention

This disclosure relates to a thin film manufacturing method and a method of manufacturing a substrate in which the thin film manufacturing method is used.

Description of the Related Art

A number of methods have been known for forming a thin film layer on a surface of an object such as a substrate. For example, Japanese Patent Application Laid-Open No. 2016-203548 discloses a method of forming an ejection orifice forming member on a substrate in manufacturing a substrate for use in a liquid ejection head by attaching a coating film member made of a photosensitive resin to a surface of a substrate and then patterning the coating film member. According to this method, the coating film member is supported on a support member until immediately before the attachment to the substrate, and the support member is peeled off the coating film member after the coating film member is attached to the substrate. The above-described method of forming the coating film member on the support member in advance and peeling the support member off after attaching the coating film member to the surface of the object (that is, a transfer recipient) is referred to as a transfer method. A spin coating method or the like is used for forming the coating film member on the support member.

When the coating film member is coated on the surface of the support member, it is desirable to use a coating film member having a small contact angle with the support member in order to make the coating film member repelled less by the support member and to accurately control a film thickness of the coating film member. In this way, it is possible to coat the coating film member accurately on the support member (the ease of application is great). On the other hand, in order to easily peel the support member off the coating film member after transferring the coating film member to the substrate, it is desirable to use a coating film member having a large contact angle with the support member and having good releasability from the viewpoint of aggregate fracture. However, in the case of a small thickness of the coating film member in particular, ensuring the releasability sacrifices the ease of application, making it more likely that the coating film member is repelled by the support member at the time of coating.

An object of this disclosure is to provide a thin film manufacturing method with which it is possible to form a thin film of a coating film member in a desired thickness even when the coating film member has high releasability from a support member, and to provide a manufacturing method of a substrate to which this thin film manufacturing method is applied.

SUMMARY OF THE INVENTION

A thin film manufacturing method of this disclosure is a manufacturing method of a thin film for manufacturing a laminate of a thin film of a coating film member and a support member. The method includes a coating step of coating the coating film member on a surface of the support member or a peeled-off member, a sandwiching step of sandwiching the coating film member between the support member and the peeled-off member, a film thinning step of reducing a thickness of the coating film member by applying an external force to the coating film member sandwiched between the support member and the peeled-off member in a state where the coating film member is softened, and a peeling step of peeling the peeled-off member off the coating film member after the film thinning step.

A manufacturing method of a substrate of this disclosure is a method of manufacturing a substrate provided with a thin film layer on its surface. The method includes the steps of attaching the laminate manufactured in accordance with the thin film manufacturing method of this disclosure to a surface of a substrate body, and peeling the support member off the laminate attached to the surface of the substrate body.

Further features of the present invention will become apparent from the following description of exemplary embodiments with reference to the attached drawings.

DESCRIPTION OF THE EMBODIMENTS

An embodiment of this disclosure will be described with reference to the drawings. A thin film manufacturing method based on this disclosure is a method for manufacturing a laminate of a thin film of a coating film member and a support member. The manufactured laminate can be used for forming a thin film layer made of the coating film member on a surface of an object such as a substrate in accordance with a transfer method and the like. The thin film manufacturing method based on this disclosure is applicable, for example, to manufacturing of a substrate used in a liquid ejection head such as an inkjet printing head that ejects a liquid such as an ink from orifices, and of a micromachine such as an acceleration sensor.

Figure 1A:
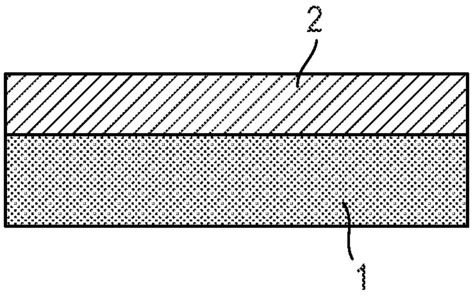
FIGS. 1A, 1B, 1C, 1D, 1E, and 1F are schematic cross-sectional views for explaining a thin film manufacturing method according to an embodiment of this disclosure.

In the thin film manufacturing method of this embodiment, a coating step of coating a coating film member 2 on one surface of a support member 1 is carried out in the first place as shown in FIG. 1A. The support member 1 is peeled off and removed after a thin film layer is transferred to a surface of a transfer recipient such as a substrate in accordance with the transfer method. Accordingly, the support member 1 is preferably a film having flexibility which is made of any of polyethylene terephthalate, polyimide, polyamide, and the like. The coating film member 2 is a resin composition such as a photoresist material and a dry film material. Methods of coating the coating film member 2 on the support member 1 include a slit coating method, a spin coating method, and the like. Various methods can be selected from the viewpoint of film thickness accuracy or productivity. Here, in order to peel the support member 1 off the coating film member 2 easily in a subsequent step, the coating film member 2 should desirably have good releasability from the viewpoint of aggregate fracture. In other words, the coating film member 2 should desirably have a large contact angle with the support member 1. On the other hand, from the viewpoint of ease of application at the time of coating the coating film member 2 on the surface of the support member 1, the coating film member 2 should preferably have a small contact angle with the support member 1. In particular, in a case where a thickness of the coating film member 2 on the support member 1 is extremely small in the submicron order, that is, below 1 for instance, there is a risk that the coating film member 2 cannot be coated uniformly on the surface of the support member 1 because the coating film member 2 is repelled by the support member 1.

Given this situation, when the thickness of the coating film member 2 supposed to be formed on the surface of the transfer recipient in accordance with the transfer method is referred to as a target film thickness, the coating film member 2 the thickness of which is sufficiently larger than the target film thickness is first coated on the support member 1 in this embodiment. This makes it possible to coat the coating film member 2 in a uniform thickness on the support member 1 while preventing the coating film member 2 from being repelled by the support member 1. Specifically, it is preferable to coat the coating film member 2 in a film thickness 1.2 to 3 times as large as the target film thickness, for example, on the support member 1. Even if the target film thickness is 0.9 μm that is below 1 for instance, the coating film member 2 can be coated in a thickness equal to or above 1 μm on the support member 1. Accordingly, even when the contact angle of the coating film member 2 with the support member 1 is large, the coating film member 2 can be coated on the support member 1 without being repelled. In other words, the coating film member 2 can be formed in a uniform layer on the surface of the support member 1 having the high releasability without being repelled.

Figure 1D:
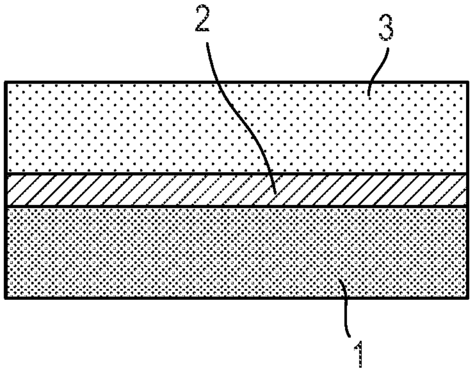
Figure 1B:
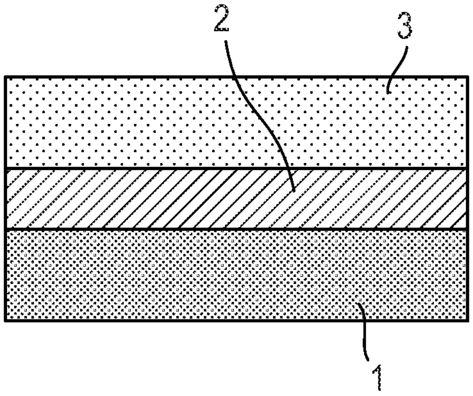

Next, a peeled-off member 3 is placed on the coating film member 2 as shown in FIG. 1B. Thus, the coating film member 2 is sandwiched between the support member 1 and the peeled-off member 3 (a sandwiching step). For example, the peeled-off member 3 is formed from a flexible film made of polyethylene terephthalate, polyimide, polyamide, or the like. Since the peeled-off member 3 has to be peeled off the coating film member 2 without peeling the coating film member 2 off the support member 1 in a subsequent peeling step, the peeled-off member 3 needs to have higher releasability from the coating film member 2 than the support member 1 does. Specifically, a contact angle of the coating film member 2 with the peeled-off member 3 is preferably larger by at least 10° than the contact angle of the coating film member 2 with the support member 1. By bringing about the difference in contact angle as described above, it is possible to leave the coating film member 2 on the support member 1 when the peeled-off member 3 is peeled off the coating film member 2. In the meantime, it is preferable to provide a surface of the peeled-off member 3 with a releasability treatment.

Figure 1E:
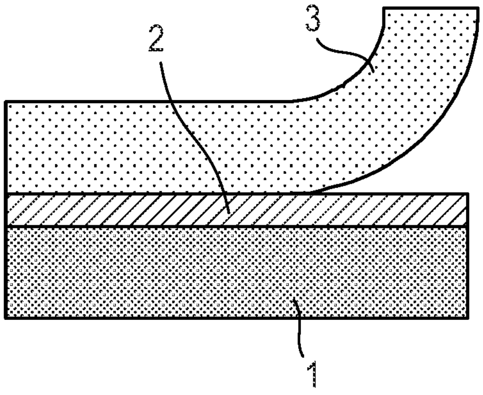
Figure 1C:
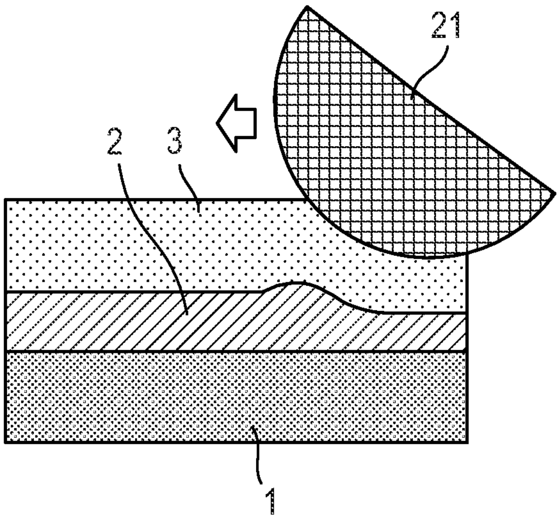

Next, a film thinning step of reducing the thickness of the coating film member 2 is carried out as shown in FIG. 1C. In the film thinning step, an external force is applied via the peeled-off member 3 to the coating film member 2 sandwiched between the support member 1 and the peeled-off member 3 in a state where the coating film member 2 is soften, thereby adjusting the film thickness of the coating film member 2 into a desired film thickness. The softening of the coating film member 2 is carried out by heating the coating film member 2 to a temperature equal to or above a softening point of the coating film member 2, for example. The higher the temperature at the time of carrying out the film thinning step relative to the softening point of the coating film member 2, the more the coating film member 2 is likely to be transformed from an elastic body into a viscous body. Hence, the coating film member 2 becomes more deformable by the external force so that the film thickness of the coating film member 2 can be reduced more. Accordingly, it is preferable to set the temperature in the film thinning step depending on the desired film thickness of the coating film member 2 to be eventually obtained, or in other words, depending on the target film thickness. Meanwhile, the support member 1 and the peeled-off member 3 are thermally expanded by a change in temperature before and after the film thinning step, and a deformation may therefore occur due to a difference in linear expansion between the support member 1 and the peeled-off member 3. For instance, the coating film member 2 may be curled. Accordingly, it is preferable to adjust a difference in coefficient of linear expansion equal to or below 30 ppm/° C. in order to keep the coating film member 2 from being curled.

Figure 2A:
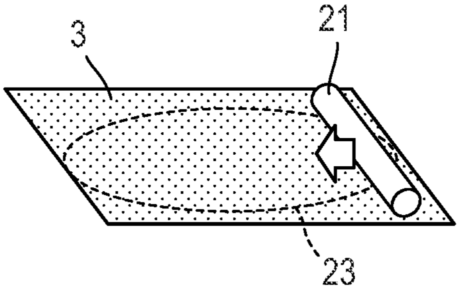
FIGS. 2A and 2B are diagrams for explaining a method of applying an external force to a coating film member.
Figure 2B:
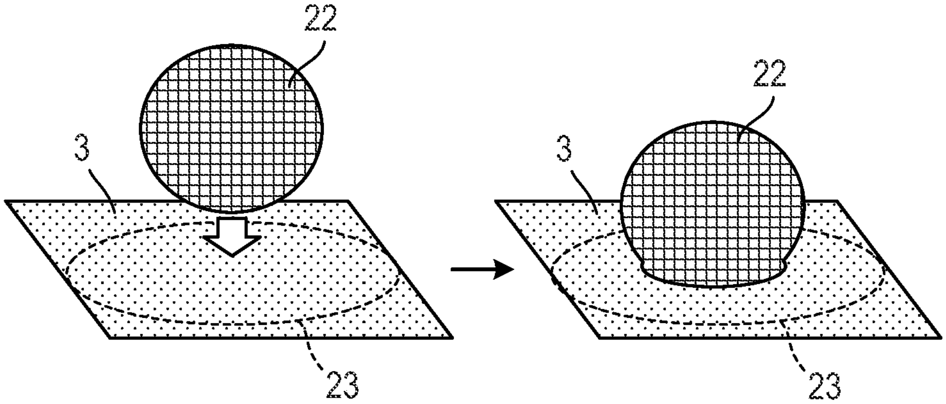

Examples of a method of applying the external force to the coating film member 2 in the film thinning step include pressure application with a moving roller, pressure application with a stamp, pressure molding, and the like. The method using the moving roller is also known as a laminate method, which is a method of pressing a roller 21 from above the peeled-off member 3 and moving the roller 21 in a direction indicated with an open arrow while applying the pressure with the roller 21 as shown in FIG. 2A. The method using the stamp is a method of bringing a stamp 22 closer to the peeled-off member 3 from above the peeled-off member 3 in a perpendicular direction to the surface of the peeled-off member 3 as indicated with an open arrow and pressing the peeled-off member 3 with this stamp 22 as shown in FIG. 2B. In each of FIGS. 2A and 2B, a region indicated with a dashed line 23 represents a coated region with the coating film member 2 on the support member 1. In the film thinning step, assuming that the thickness of the coating film member 2 after carrying out the film thinning step is a and the thickness of the coating film member 2 before carrying out the film thinning step is b, the thickness of the coating film member 2 is reduced so as to satisfy a relation $\frac{1}{3} \leq a/b \leq \frac{5}{6}$, for example. After the film thinning step, it is possible to obtain the coating film member 2 that is formed uniformly on the support member 1 and is reduced in film thickness as shown in FIG. 1D.

Figure 1F:
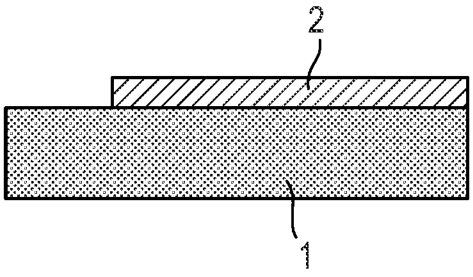

Lastly, in the peeling step, the peeled-off member 3 is peeled off the coating film member 2 as shown in FIG. 1E. Thus, a laminate in which the thin film of the coating film member 2 is laminated on the support member 1 is obtained. This laminate is used for forming a thin film layer made of the coating film member 2 on the surface of the transfer recipient in accordance with the transfer method, for example. When the thin film layer is formed on the surface of the transfer recipient by using the laminate, the laminate may be attached to the surface of the transfer recipient and then the support member 1 may be peeled off the surface of the laminate attached to the surface of the transfer recipient. Before the thin film layer made of the coating film member 2 is formed on the surface of the transfer recipient in accordance with the transfer method, it is preferable to remove an outer peripheral portion of the coating film member 2 in conformity to a shape of the transfer recipient as shown in FIG. 1F. By removing the outer peripheral portion of the coating film member 2 in conformity to the shape of the transfer recipient, it is possible to suppress development of burr when the thin film layer is formed on the surface of the transfer recipient in accordance with the transfer method. Note that the sandwiching step and the film thinning step are different from each other. Specifically, reducing the coating film member 2 in thickness by applying the external force to the coating film member 2 is not performed while sandwiching the coating film member 2 in the sandwiching step, or in other words, the sandwiching step and the film thinning step are not carried out at the same time due to the following reason. Specifically, accuracy in each step is degraded if the sandwiching step and the film thinning step are carried out at the same time, and it is difficult to form the coating film member 2 in a desired thickness in this way, for instance.

Some changes can be made in the above-described thin layer manufacturing method of this embodiment. While the coating film member 2 is coated on the support member 1 in the example described with reference to FIGS. 1A to 1F, the coating film member 2 may be coated on the surface of the peeled-off member 3 instead of the support member 1 and then the coating film member 2 may be sandwiched between the support member 1 and the peeled-off member 3 by bringing the support member 1 into contact with another surface of the coating film member 2 on the opposite side of the peeled-off member 3. Thereafter, the laminate of the support member 1 and the coating film member 2 laminated together can be obtained by carrying out the film thinning step and the peeling step as described above. The outer peripheral portion of the coating film member 2 may be removed in conformity to the shape of the transfer recipient from the obtained laminate. Meanwhile, it is also possible to form the thin film layer made of the coating film member 2 directly on the transfer recipient by using the transfer recipient as the support member 1.

A modified example of this embodiment will be described. The laminate may be obtained by coating the coating film members 2 on both the support member 1 and the peeled-off member 3, then attaching the coating film member 2 on the support member 1 to the coating film member 2 on the peeled-off member 3, and then carrying out the film thinning step and the peeling step as described above. Specifically, assuming that the coating film member coated on the support member 1 is a first coating film member and the coating film member coated on the peeled-off member 3 is a second coating film member, the first coating film member is attached to the second coating film member in the first place so as to bring the first coating film member into contact with the second coating film member (an attaching step). Next, the first coating film member and the second coating film member are softened and the external force is applied to the first coating film member and the second coating film member, thereby reducing the thickness of the first coating film member and the thickness of the second coating film member (the film thinning step). Thereafter, the peeled-off member is peeled off the second coating film member (the peeling step). Here, a material constituting the coating film member 2 coated on the support member 1 may be a different material constituting the coating film member 2 coated on the peeled-off member 3. The obtained laminate can be used for forming the thin film layer of the second coating film member and the first coating film member laminated in this order on the surface of the transfer recipient in accordance with the transfer method. After obtaining the laminate of the first coating film member and the second coating film member laminated on the support member 1, outer peripheral portions of the first coating film member and the second coating film member may be removed in conformity to the shape of the transfer recipient.

In the film thinning step, it is preferable to soften the first coating film member and the second coating film member by applying a temperature equal to or above the softening point of the first coating film member and equal to or above the softening point of the second coating film member. In this instance, the materials constituting the first coating film member and the second coating film member are preferably selected such that the temperature of the softening point of the first coating film member is equal to or above the softening point of the second coating film member so as to improve flatness of the first coating film member and the second coating film member. Through the film thinning step, each of the thickness of the first coating film member and the thickness of the second coating film member is reduced.

This disclosure will be described below in further details based on actual examples. Here, a description will be given of examples of applying the thin film manufacturing method based on this disclosure to manufacturing of a substrate used in a liquid ejection head. First, the substrate for the liquid ejection head will be described with reference to FIG. 3.

In the substrate for the liquid ejection head, energy generating elements 6 that generate energy for forming bubbles of a liquid, driving circuits for driving the energy generating elements 6, and the like are formed on one surface of a silicon substrate 5 serving as a substrate body. Moreover, a liquid supply port 7 that establishes communication between two surfaces of the silicon substrate 5 is formed by etching. A flow channel forming member 8 and an ejection orifice forming member 11 are formed above the energy generating elements 6, and the ejection orifice forming member 11 is provided with ejection orifices 9 for ejecting the liquid. The flow channel forming member 8 is provided with flow channels 12 for supplying the liquid to the ejection orifices 9. Each ejection orifice 9 communicates with the corresponding flow channel 12 and is open to a surface of the ejection orifice forming member 11. A bubble is generated in the liquid by driving the energy generating element 6 corresponding to each ejection orifice 9 so that the liquid such as an ink can be ejected from the ejection orifice 9 by use of a pressure of the generated bubble. Thus, it is possible to perform printing by using the ejected liquid.

Example 1

Figure 3:
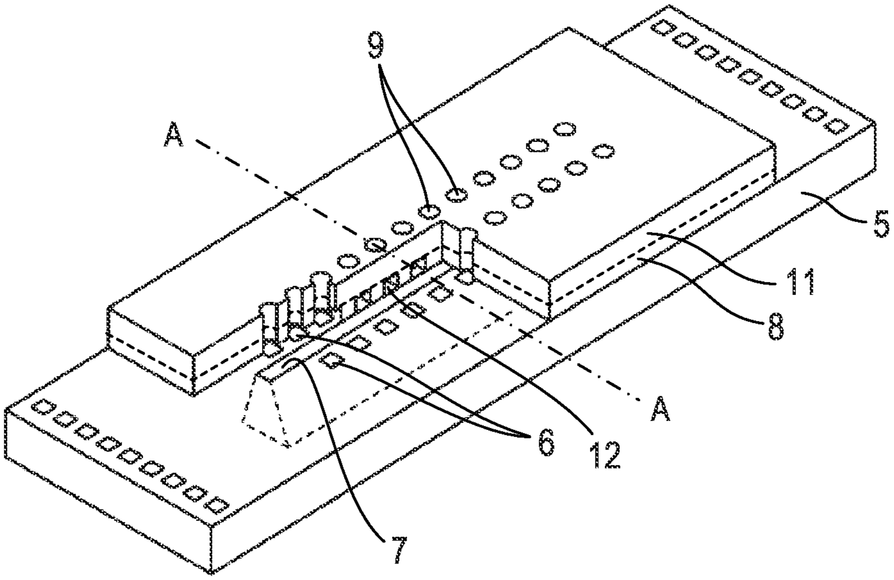
FIG. 3 is a perspective view showing an example of a substrate used in a liquid ejection head.
Figure 4A:
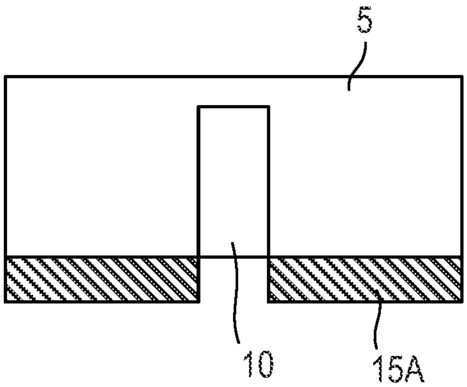
FIGS. 4A, 4B, 4C, 4D, 4E, and 4F are cross-sectional views for explaining Example 1.
Figure 4B:
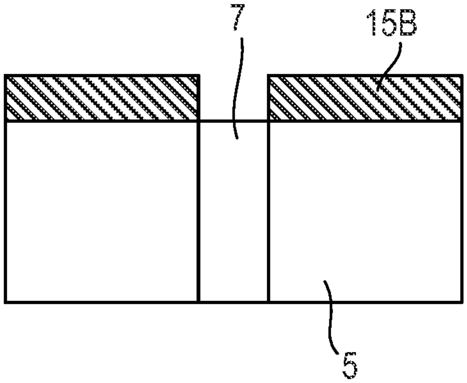

The substrate for the liquid ejection head illustrated in FIG. 3 was produced. FIGS. 4A to 4F are cross-sectional views showing a sequence of manufacturing procedures of the substrate. In particular, FIGS. 4A, 4B, and 4F are cross-sectional views taken along the A-A line in FIG. 3. First, as shown in FIG. 4A, another surface (a surface on a lower side in FIG. 4A) of the silicon substrate 5 serving as the substrate body was subjected to etching by using a photoresist as an etching mask 15A, thereby forming a blind hole 10. Then, as shown in FIG. 4B, the one surface (a surface on an upper side in FIG. 4A) of the silicon substrate 5 was subjected to silicon etching by using a photoresist as an etching mask 15B, thereby boring a hole directed to the blind hole 10 from the one surface side so as to form the liquid supply port 7.

Figure 4C:
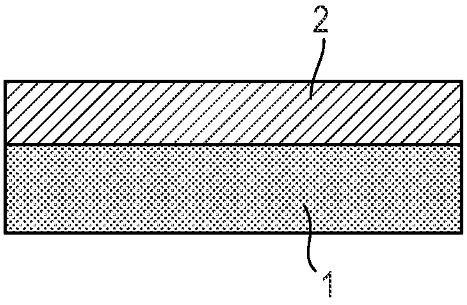
Figure 4D:
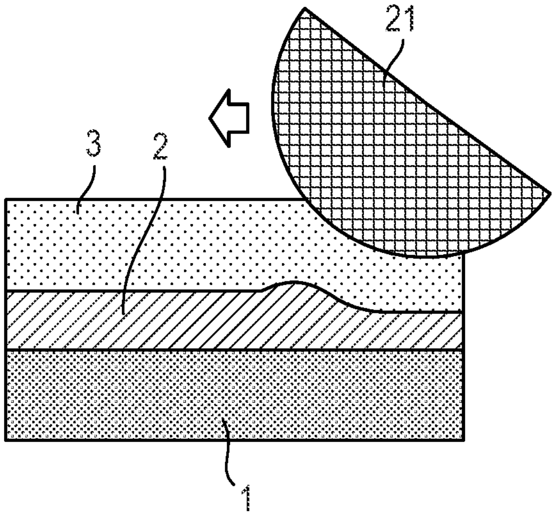

Next, apart from the silicon substrate 5, the coating film member 2 was coated in accordance with the spin coating method on the support member 1 made of polyethylene terephthalate in a thickness of 100 μm as shown in FIG. 4C. A negative photosensitive resin having a softening point temperature of 50° C. was used as the coating film member 2. When the film thickness of the coating film member 2 was set to 0.5 μm, the coating film member 2 was not formed into a uniform film because the coating film member 2 was repelled by the support member 1. Accordingly, in order to keep the coating film member 2 from being repelled by the support member 1, the coating film member 2 was uniformly coated on the support member 1 with the film thickness of the coating film member 2 set to 1.0 μm. Although a baking treatment may also be carried out after coating the coating film member 2, the film thickness needs to be set to a further sufficient one in the case of carrying out the backing treatment because the coating film member 2 is prone to be repelled more as a consequence of the baking treatment. Thereafter, the sandwiching step was carried out by placing the peeled-off member 3 on the coating film member 2 as shown in FIG. 4D. Subsequently, the film thinning step was carried out by pressing the coating film member 2 with the roller 21 via the peeled-off member 3 and moving the roller 21 in this state in a direction indicated with an open allow in FIG. 4D. In the film thinning step, the coating film member 2 was softened at an implementation temperature of 90° C. and the coating film member 2 was formed into a thin film in a thickness of 0.5 μm by setting a moving speed of the roller 21 to 5 mm/sec. Meanwhile, the difference in coefficient of linear expansion between the support member 1 and the peeled-off member 3 was 5 ppm/° C.

Figure 4E:
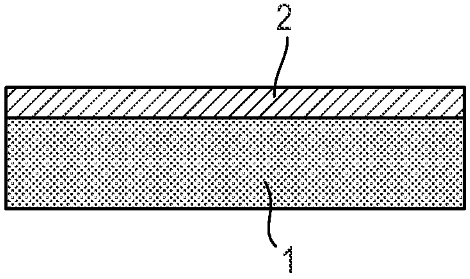
Figure 4F:
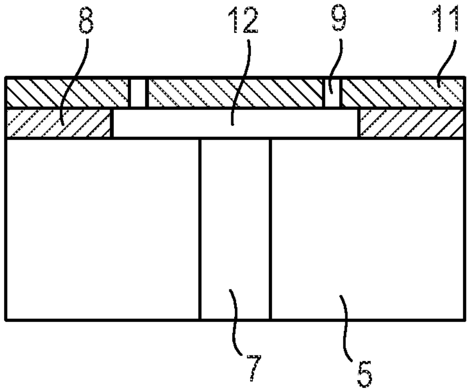

Next, the peeling step was carried out to peel the peeled-off member 3 off the coating film member 2 at a peeling rate of 3 mm/s. As a consequence, the laminate in which the coating film member 2 was uniformly laminated in the film thickness of 0.5 μm on the support member 1 was obtained as shown in FIG. 4E. Here, the contact angle of the coating film member 2 with the peeled-off member 3 was set larger by 15° than the contact angle of the coating film member 2 with the support member 1 so as to surely leave the coating film member 2 on the support member 1 in the peeling step. Thereafter, a portion of the coating film member 2 corresponding to the outer periphery of the silicon substrate 5 was removed by side rinsing.

The laminate thus obtained can be used in manufacturing of the substrate for a liquid ejection head. When manufacturing the substrate, the coating film member 2 is first attached onto the silicon substrate 5 serving as the transfer recipient and the support member 1 is peeled off the coating film member 2 in the attached state. Thereafter, the coating film member 2 is processed into a desired shape and formed into the flow channel forming member 8. As for a processing method for forming the flow channel forming member 8, it is possible to use a method including exposure and development treatments when the coating film member 2 is made of a photosensitive resin, or to use a method including etching by use of a resist mask or the like when the coating film member 2 is not photosensitive. Then, a resin layer to be formed into the ejection orifice forming member 11 provided with the ejection orifices 9 is laminated on the flow channel forming member 8, and the ejection orifices 9 are formed by processing this resin layer into a desired shape. The resin layer for forming the ejection orifice forming member 11 can also be provided on the flow channel forming member 8 in accordance with the transfer method. In this case, it is possible to form the resin layer serving as the coating film member on the support member in accordance with the thin film manufacturing method based on this disclosure and to use the resin layer for the transfer. As a consequence, the substrate for the liquid ejection head is finished as shown in FIG. 4F. Although this example has described the case of transferring the coating film member 2 onto the silicon substrate 5 after forming the thin film of the coating film member 2 on the support member 1, the coating film member 2 may be directly formed on the silicon substrate 5 instead.

Example 2

While the flow channel forming member 8 and the ejection orifice forming member 11 are separately formed on the silicon substrate 5 in Example 1, the flow channel forming member 8 and the ejection orifice forming member 11 may be formed at the same time instead. Example 2 will describe an example in which a laminate was manufactured to be used in order to form the flow channel forming member 8 and the ejection orifice forming member 11 at the same time. FIGS. 5A to 5D are cross-sectional views showing a sequence of manufacturing procedures of the substrate in Example 2.

Figure 5A:
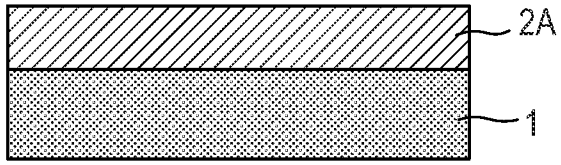
FIGS. 5A, 5B, 5C, and 5D are cross-sectional views for explaining Example 2.
Figure 5B:
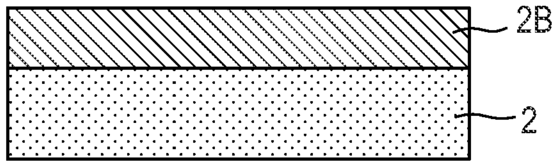
Figure 5C:
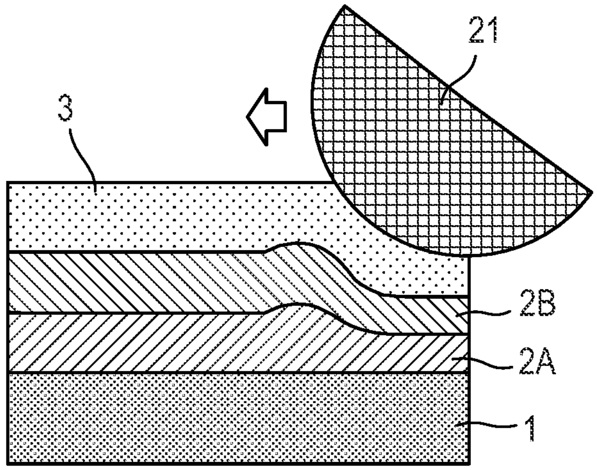
Figure 5D:
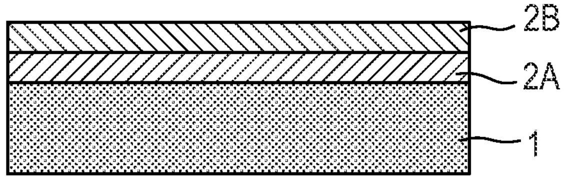

To begin with, a first coating film member 2A in a thickness of 3.0 μm was formed in accordance with the spin coating method on the support member 1 made of polyethylene terephthalate in the thickness of 100 μm as shown in FIG. 5A. The negative photosensitive resin having the softening point temperature of 50° C. was used as the first coating film member 2A. Next, a second coating film member 2B in a thickness of 3.0 μm was formed in accordance with the spin coating method on the peeled-off member 3 as shown in FIG. 5B. The negative photosensitive resin having the softening point temperature of 50° C. was used as the second coating film member 2B. Thereafter, as shown in FIG. 5C, the sandwiching step and the film thinning step were carried out by attaching the first coating film member 2A formed on the support member and the second coating film member 2B formed on the peeled-off member in the coating step to each other, and then applying the external force with the moving roller in a state where these coating film members 2A and 2B are softened. In the film thinning step, the implementation temperature was set to 80° C. and the moving speed of the roller was set to 5 mm/sec. As a consequence of the film thinning step, the film thickness of the first coating film member 2A was reduced to 2.0 μm and the film thickness of the second coating film member 2B was reduced to 2.0 μm. Thereafter, the peeling step was carried out to peel the peeled-off member 3 off the second coating film member 2B at the peeling rate of 3 mm/s. As a consequence, the laminate was obtained as shown in FIG. 5D. In this laminate, the first coating film member 2A in the film thickness of 2.0 μm and the second coating film member 2B in the film thickness of 2.0 μm are laminated in this order on the support member 1.

Following is a method of manufacturing a substrate for a liquid ejection head including the laminate formed as described above. First, the laminate is attached to the silicon substrate 5 on which the energy generating elements 6, the liquid supply port 7, and the like have been provided in advance. Then, the support member 1 is peeled off. As a consequence, the second coating film member 2B and the first coating film member 2A collectively serving as the thin film layer are laminated in this order on the silicon substrate 5. The second coating film member 2B serves as the photosensitive resin layer corresponding to the flow channel forming member 8 while the first coating film member 2A serves as the photosensitive resin layer corresponding to the ejection orifice forming member 11. Exposure characteristics of the photosensitive resin constituting the first coating film member 2A may be set different from exposure characteristics of the photosensitive resin constituting the second coating film member 2B and the exposure and development with the different exposure characteristics taken into account may be carried out. In this way, it is possible to form the ejection orifices 9 in the first coating film member 2A while forming the flow channels 12 in the flow channel forming member 8. As a consequence, the substrate for the liquid ejection head can be obtained as shown in FIG. 3.

According to this disclosure, when manufacturing the laminate of the thin film of the coating film member and the support member, it is possible to form the coating film member in a desired thickness even when the coating film member has high releasability from the support member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-127867, filed Jul. 29, 2020, which is hereby incorporated by reference herein in its entirety.

What is claimed is:

1. A method of manufacturing a liquid ejection head including a silicon substrate, a flow channel forming member laminated on the silicon substrate to provide a flow channel, and an ejection orifice forming member laminated on the flow channel forming member to provide an ejection orifice, the method comprising:

a step of preparing a support member having a surface;

a coating step of applying a coating film member onto the surface of the support member to obtain a laminate including the coating film member;

a baking step of carrying out a baking treatment, after the coating step, to the laminate including the coating film member;

a sandwiching step of laminating a peeled-off member on the coating film member subjected to the baking treatment to sandwich the coating film member between the support member and the peeled-off member;

a film thickness adjusting step, which is carried out subsequently to and separately from the sandwiching step, of applying an external force to the coating film member sandwiched between the support member and the peeled-off member to reduce a thickness of the coating film member;

a peeling step of peeling the peeled-off member off the coating film member, which is conducted subsequently to the film thickness adjusting step, to obtain the coating film member laminated on the support member;

a flow channel forming member processing step of forming the flow channel, after attaching a silicon substrate to the coating film member laminated on the support member and then peeling the support member, to obtain the flow channel forming member laminated on the silicon substrate; and an ejection orifice forming member processing step of forming the ejection orifice, after attaching a second coating film member laminated on a second support member manufactured separately in the same manner as the coating film member processed to the flow channel forming member laminated on the silicon substrate such that the second coating film member is laminated on the second support member with the flow channel forming member on the silicon substrate and then peeling the second support member, to obtain the ejection orifice forming member laminated on the flow channel forming member laminated on the silicon substrate.

2. The method according to claim 1, wherein the film thickness adjusting step is carried out at a temperature equal to or above a softening point of the coating film member.

3. The method according to claim 1, wherein, when the thickness of the coating film member after carrying out the film thickness adjusting step is a and the thickness of the coating film member before carrying out the film thickness adjusting step is b, the thicknesses satisfy a relation of $\frac{1}{3} \leq a/b \leq \frac{5}{6}$.

4. The method according to claim 1, wherein a contact angle of the coating film member with the peeled-off member is larger by at least 10° than a contact angle of the coating film member with the support member.

5. The method according to claim 1, wherein the external force is applied in the film thickness adjusting step by any of pressure application with a moving roller, pressure application with a stamp, and pressure molding.

6. The method according to claim 1, wherein the coating step is carried out by applying a coating film material to the support member by a slit coating method or a spin coating method.

7. The method according to claim 1, wherein a difference in a coefficient of linear expansion between the support member and the peeled-off member is equal to or less than 30 ppm/° C.

8. A method of manufacturing a liquid ejection head including a silicon substrate, a flow channel forming member laminated on the silicon substrate to provide a flow channel, and an ejection orifice forming member laminated on the flow channel forming member to provide an ejection orifice, the method comprising:

a step of preparing a support member having a surface;

a first coating film member applying step of applying a first coating film member on a surface of the support member;

a second coating film member applying step of applying a second coating film member on a surface of a peeled-off member;

a baking step of carrying out a baking treatment, after the first and second coating film member applying step;

a laminating step of laminating the first coating film member and the second coating film member as facing each other, after the baking step;

a film thickness adjusting step of applying an external force to the first coating film member and the second coating film member to reduce a thickness of the first coating film member and a thickness of the second coating film member;

a peeling step of peeling the peeled-off member off the second coating film member, which is conducted subsequently to the film thickness adjusting step, to obtain the first and second coating film members laminated on the support member;

a flow channel forming member processing step of forming the flow channel, after attaching a silicon substrate to the second coating film member laminated with the first coating film member on the support member and then peeling the support member, to obtain the flow channel forming member laminated on the silicon substrate; and an ejection orifice forming member processing step of forming the ejection orifice, after attaching third and fourth coating film members laminated on a second support member manufactured separately in the same manner as the first and second coating film members processed to the flow channel forming member laminated on the silicon substrate such that the third and fourth coating film members are laminated on the second support member with the flow channel forming member on the silicon substrate and then peeling the second support member, to obtain the ejection orifice forming member laminated on the flow channel forming member laminated on the silicon substrate.

9. The method according to claim 8, wherein the film thickness adjusting step is carried out at a temperature equal to or above a softening point of the first coating film member and equal to or above a softening point of the second coating film member.

10. The method according to claim 8, wherein the external force is applied in the film thickness adjusting step by any of pressure application with a moving roller, pressure application with a stamp, and pressure molding.

* * * * *